United States Patent Office 3,065,238
Patented Nov. 20, 1962

3,065,238
PRODUCTION OF 1,3,4-OXDIAZOLES
Hans Weidinger and Joachim Kranz, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Mar. 13, 1959, Ser. No. 799,075
Claims priority, application Germany Mar. 20, 1958
2 Claims. (Cl. 260—296)

This invention relates to the production of 1,3,4-oxdiazoles. More specifically, the invention relates to a generally applicable process for the production of 1,3,4-oxdiazoles wherein an imido-ether salt is reacted with a monoacyl hydrazide at elevated temperature and in the presence of a solvent. The salt of the imdo-ether may be formed in the reaction mixture by treating the corresponding nitriles in the presence of the corresponding alcohols with a strong acid.

It is known from the literature that 1,3,4-oxdiazoles can be obtained by treating N,N'-diacyl hydrazides with dehydrating agents. In some cases it is sufficient, although at the expense of the yield and the purity, to heat the N,N'-diacylhydrazides by themselves to elevated temperatures in order to achieve the ring closure to the 1,3,4-oxdiazoles by the splitting off of water.

2,5-diaryl-1,3,4-oxdiazoles have already been prepared by the action of alkali hypochlorite solution on aldehyde-acyl-hydrazones in alkaline medium. This process, however, does not apply to aldehyde-acyl-hydrazones derived from 1,4-diamino-anthraquinone-2-carboxylic acid or from 1,4-diaminoanthraquinone-2-aldehyde. Finally, it is known that 1,3,4-oxdiazoles can be obtained by treating dicarboxylic acid hydrazides together with carboxylic acids with agents capable of splitting off water. In the latter process, however, in many cases the reaction material is obtained in the form of an extremely fine precipitate, sometimes even in colloidal condition, and is then difficult to wash and separate. Moreover, it cannot be used for the technically important anthraquinone-2-carboxylic acids. For example the treatment of 1-aminoanthraquinone-2-carboxylic acid or 1,4-diaminoanthraquinone-2-carboxylic acid and succinic or terephthalic acid dihydrazide with agents which split off water does not lead to the desired bis-oxdiazoles.

The known methods for the production of 1,3,4-oxdiazoles thus proceed with the splitting off of water or of hydrogen and require, apart from the few exceptional cases already mentioned, the use of condensing agents, i.e. agents for splitting off water, or oxidizing agents or, more correctly, dehydrogenating agents. If a generally applicable process for the production of 1,3,4-oxdiazoles is sought which will yield the resultant products not only in good yields with short reaction periods but also in an excellent state of purity, then the processes already known are not satisfactory.

We have now found that 1,3,4-oxdiazoles are obtained in a condition of especially great purity by allowing an imido-ether salt to act on a monoacyl hydrazide at elevated temperature and in the presence of a solvent.

One of the reactants may contain the groups which enter into reaction, namely the group —CO.NH—NH$_2$ or the imido-ether group, more than once. The compounds having the group —CO.NH—NH$_2$ are hereinafter referred to as monoacyl hydrazides.

As monoacyl hydrazides of carboxylic acids which, besides the —CO.NH—NH$_2$ group, do not contain any substituents capable of reacting with imido-ethers and/or their salts, there may be mentioned for example the monoacyl hydrazides of aliphatic, cycloaliphatic, aromatic, heterocyclic non-vattable and vattable monocarboxylic or dicarboxylic acids, such as acetic acid, succinic acid, benzoic acid, isophthalic acid, terephthalic acid, 1-aminoanthraquinone-2-carboxylic acid or 1,4-diaminoanthraquinone-2-carboxylic acid.

For practical reasons, the ether components in the imido-ethers are in general the radicals of short-chained saturated aliphatic alcohols, such as are usually contained in imido-ethers, as for example of methanol or ethanol.

The acid radical in the imido-ethers may be an aliphatic saturated or unsaturated, linear or branched group preferably containing up to six carbon atoms in the chain. The acid radical may be derived also from a cycloaliphatic compound, from an aromatic compound or from a heterocyclic compound. These compounds preferably contain up to two benzene nuclei, but also three or more isolated or annelated benzene nuclei. The heterocyclic rings may also be represented more than once in the imido-ethers. The imido-ethers may also contain other substituents, such as halogen atoms, alkyl groups, for example low molecular weight alkyl groups, aryl groups, aralkyl groups, nitro groups, trifluormethyl groups, aminosulfonyl groups, alkylsulfonyl groups and/or acylamino groups.

According to the new process there are used as initial materials the salts of the imido-ethers, for example their hydrochlorides. Furthermore, it is possible to allow such salts to form in the reaction mixture itself by treating the corresponding nitriles in the presence of an alcohol with a strong acid, for example with hydrogen chloride.

The reaction, which proceeds with the splitting off of alcohol and ammonia or ammonium salt, for example ammonium chloride, is carried out at elevated temperature which may amount to up to 220° C. Especially good results are obtained by choosing a temperature range between 70° and 180° C. The new process is carried out in the presence of solvents and/or diluents, as for example lactams, such as N-methylpyrrolidone, alcohols, such as ethanol, tertiary amines, such as pyridine, or simple benzene derivatives, such as nitrobenzene. Acid-binding agents, as for example sodium bicarbonate or potassium carbonate, may be present during the reaction, but are not necessary. The reaction period amounts as a rule to ½ to 2½ hours. For the reaction it is merely necessary to use stoichiometrical amounts of the initial materials, i.e. one imido-ether group must be available for each —CO.HN—NH$_2$ group. It is advantageous, however, to start with an excess of about 10% of imido-ether.

The ring closure to form the 1,3,4-oxdiazole takes place according to the new process after the components have been brought together without the use of condensing agents or dehydrogenating agents. The new process is generally applicable and is recommendable by reason of the ready accessibility of the reactants, the short reaction periods, good yields and not the least by reason of the excellent purity of the products obtained. In the case of unsymmetrically substituted 1,3,4-oxdiazoles, the result is achieved in a single stage whereas according to the above-mentioned known methods two stages are necessary, namely those of acylating the carboxylic acid monohydrazide and of effecting the ring closure.

The new process is of special technical interest for the production of 2-anthraquinonyl-5-alkyl- or -aryl-1,3,4-oxdiazoles which contain a 1-amino- or 1,4-diaminoanthraquinonyl-2-radical. For this purpose, it is advantageous to allow an aliphatic or aromatic imido-ether salt to act on the monohydrazide of 1-aminoanthraquinone-2-carboxylic acid or of 1,4-diamino-anthraquinone-2-carboxylic acid.

The 1,3,4-oxdiazoles may serve as intermediate products for the production of dyestuffs and optical brightening agents. Some of them are themselves valuable dyestuffs for dyeing structures, for example textile materials, of native and/or regenerated cellulose or of linear polyamides.

The following examples will further illustrate this invention but the invention is not restricted to these examples. The parts specified in the examples are parts by weight.

*Example 1*

13.6 parts of benzhydrazide and 21 parts of benzimidoethyl ether hydrochloride are heated in 120 parts of N-methylpyrrolidone for an hour at 160° C. while stirring. By adding water to the cooled reaction solution, 2,5-diphenyl-1,3,4-oxdiazole is precipitated in the form of colorless crystals which are filtered off by suction, washed with water and dried. 18 parts of the reaction product of the formula

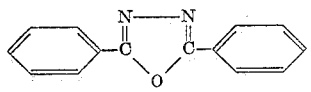

having a melting point of 137° to 138° C. are obtained.

*Example 2*

13.6 parts of benzhydrazide and 14 parts of acetic acid imidoethyl ether hydrochloride are heated in 100 parts of pyridine for an hour at 160° C. while stirring, the ammonium chloride formed is filtered off by suction and the filtrate concentrated in vacuo. The residual oil soon solidifies to colorless crystals of the melting point 61° to 64° C. 15 parts of 2-methyl-5-phenyl-1,3,4-oxdiazole are obtained.

*Example 3*

A mixture of 10 parts of benzhydrazide, 11.3 parts of isophathalic acid bis-imidoethyl ether hydrochloride and 100 parts of N-methylpyrrolidone is heated for an hour at 160° C. while stirring. The bis-oxdiazole having the structure

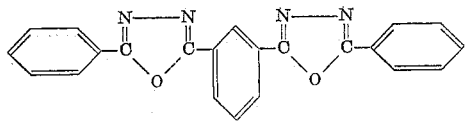

is precipitated in a good yield from the cooled solution diluted with methanol by the addition of water.

The compound melts at 237° to 239° C. The yield is 9 parts.

*Example 4*

A mixture of 7 parts of 1-aminoanthraquinone-2-carboxylic acid hydrazide, 3.5 parts of acetic acid imidoethyl ether hydrochloride and 70 parts of nitrobenzene is stirred for an hour at 160° C. It is then allowed to cool, the dyestuff formed is filtered off, washed with methanol and dried. 6.8 parts of the reaction product of the formula

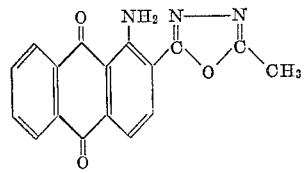

are obtained in the form of red lustrous crystal needles of the melting point 262° to 265° C.

The same dyestuff is obtained by working in the presence of pyridine or potassium carbonate in equally good yields and purity. It dyes fabric of linear polycaprolactam red shades.

*Example 5*

10 parts of 1,4-diaminoanthraquinone-2-carboxylic acid hydrazide and 5 parts of acetic acid imido-ethyl ether hydrochloride are stirred in 90 parts of N-methylpyrrolidone for an hour at 160° C. After cooling, the precipitated dyestuff is filtered off by suction, washed with methanol and dried. 8 parts of the dyestuff of the formula

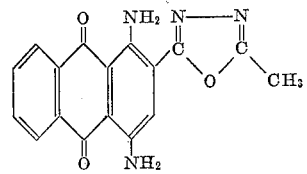

are obtained in the form of a blue powder of the melting point 267° to 269° C. The dyestuff dyes textile materials of linear polyhexamethylene diamine adipate blue shades.

*Example 6*

A mixture of 30 parts of 1-aminoanthraquinone-2-carboxylic acid hydrazide, 13.8 parts of succinic acid bis-imidoethyl ether hydrochloride and 270 parts of nitrobenzene is kept for an hour at 160° C. while stirring. The dyestuff, worked up as in Example 5, occurs in a good yield (29.5 parts) in the form of a red powder. It dyes cotton from a red vat powerful red shades and corresponds to the following formula

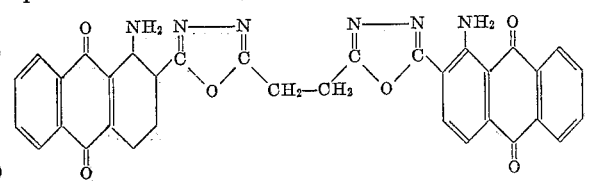

*Example 7*

11.8 parts of 1,4-diaminoanthraquinone-2-carboxylic acid hydrazide and 5.2 parts of succinic acid bis-imidoethyl ether hydrochloride are stirred for an hour in 100 parts of N-methyl-pyrrolidone at 160° C. After the dyestuff has been separated as described in Example 5, there are obtained 8.5 parts thereof in the form of dark blue crystals. The dyestuff dyes cotton very powerful blue shades from a red vat and has the following structure

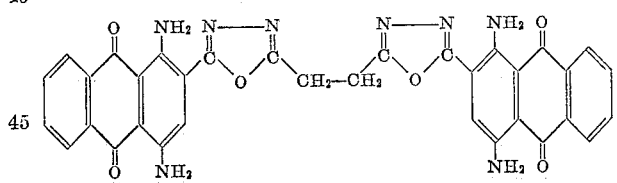

*Example 8*

A mixture of 21 parts of 1-aminoanthraquinone-2-carboxylic acid hydrazide, 16 parts of benzimidoethyl ether hydrochloride and 200 parts of nitrobenzene is stirred for an hour at 160° C. The reaction product is worked up as described in Example 5 and there are obtained 24.7 parts of a red crystal powder of the melting point 307° to 310° C. The compound is constructed as follows

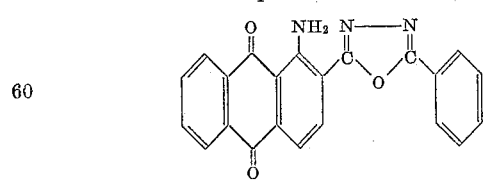

The same dyestuff is obtained by proceeding as follows: A mixture of 200 parts of benzonitrile and 20 parts of ethanol is saturated with dry hydrogen chloride while cooling. Into the mixture there are then introduced 20 parts of 1-amino-anthraquinone-2-carboxylic acid hydrazide and stirred for an hour at 160° C. After working up as described in Example 5, 19 parts of a red crystalline powder are obtained which agrees in its properties with the product obtained according to paragraph 1 of this example. The dyestuff dyes textile material of linear polyhexamethylene diamine adipate red shades.

Example 9

A mixture of 10 parts of 1,4-diaminoanthraquinone-2-carboxylic acid hydrazide, 7.5 parts of benzimidoethyl ether hydrochloride and 90 parts of N-methylpyrrolidone is heated for an hour at 160° C. while stirring and worked up as described in Example 5. 8.5 parts of the reaction product are obtained in the form of blue crystals of the melting point 327° to 329° C. The dyestuff dyes cotton or linear polycaprolactam blue shades from a red vat and has the following structure

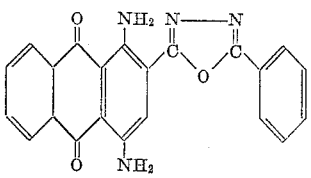

Example 10

10 parts of 1-aminoanthraquinone-2-carboxylic acid hydrazide and 5.5 parts of isophthalic acid bis-imidoethyl ether hydrochloride are stirred in 110 parts of N-methyl-pyrrolidone for an hour at 160° C. and worked up according to Example 5. 7.5 parts of the reaction product are obtained in the form of a red powder. The dyestuff which dyes cotton powerful red shades from a red vat has the following constitution

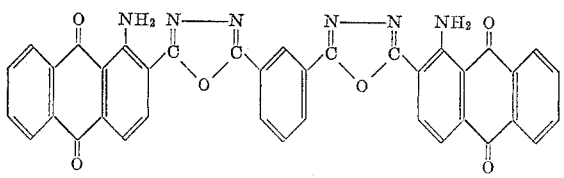

Example 11

The procedure of Example 10 is followed but terephthalic acid bis-imidoethyl ether hydrochloride is used instead of isophthalic acid bis-imidoethyl ether hydrochloride. 9.1 parts of the isomeric dyestuff of the formula

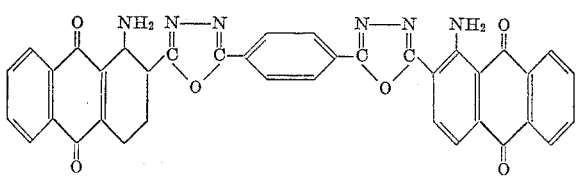

are obtained in the form of a red powder. The dyestuff also dyes cotton a powerful red from a red-brown vat.

Example 12

A mixture of 10 parts of 1,4-diaminoanthraquinone-2-carboxylic acid hydrazide, 4.8 parts of isophthalic acid bis-imidoethyl ether hydrochloride and 100 parts of N-methylpyrrolidone is stirred for an hour at 160° C. and worked up as described in Example 5. The dyestuff obtained in a good yield (7.7 parts) in the form of a blue powder, dyes cotton blue shades from a red vat and has the following structure

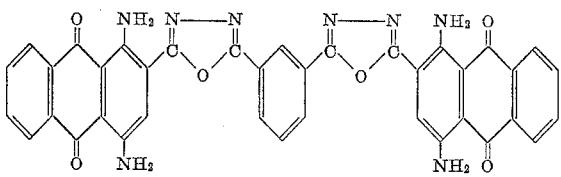

Example 13

By working as in Example 12 but using terephthalic acid bis-imidoethyl ether hydrochloride instead of isophthalic acid bis-imidoethyl ether hydrochloride, there are obtained 7.5 parts of the isomeric dyestuff in the form of a blue powder. The dyestuff dyes cotton also blue shades from a violet vat and has the following constitution

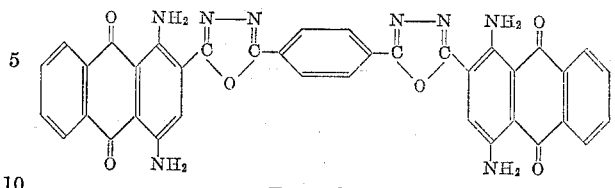

Example 14

14 parts of 1-aminoanthraquinone-2-carboxylic acid hydrazide and 6 parts of formimidoethyl ether hydrochloride are stirred in 140 parts of N-methylpyrrolidone for an hour at 160° C., filtered by suction when cold, washed with methanol and dried. 10.7 parts of 1-aminoanthraquinone-2-oxdiazole of the formula

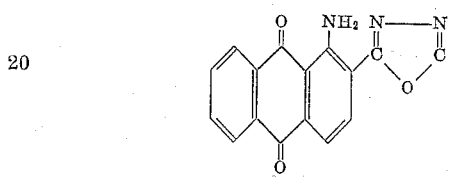

are obtained in the form of red crystal needles of the melting point 294° to 295° C.

Example 15

10 parts of benzhydrazide and 11.3 parts of terephthalic acid bis-imidoethyl ether hydrochloride (which is prepared in a corresponding way to that described in the literature for the production of isophthalic acid bis-imidoethyl ether hydrochloride) are heated in 100 parts of N-methylpyrrolidone for an hour at 160° C. while stirring, the crystals precipitated from the cooled solution are filtered off by suction, washed with methanol and dried. There are obtained 6 parts of a bis-oxdiazole of the formula

having the melting point 311° to 313° C.

Example 16

The bis-oxdiazole described in Example 15 is also obtained when the following procedure is adopted:

A mixture of 20.5 parts of benzimidoethyl ether hydrochloride and 9.7 parts of terephthalic acid dihydrazide is stirred in 150 parts of N-methylpyrrolidone for an hour at 160° C. and worked op according to Example 15. 7.5 parts of the reaction product are obtained in the form of colorless crystal leaflets of the melting point 311° to 313° C.

Example 17

21 parts of benzimidoethyl ether hydrochloride, 13.7 parts of isonicotinic acid hydrazide and 120 parts of N-methylpyrrolidone are stirred for an hour at 160° C. The precipitated ammonium chloride is then filtered off by suction and the oxdiazole precipitated from the filtrate with water. 14 parts of the reaction product of the formula

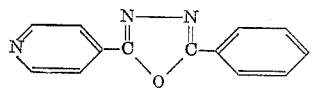

are obtained in the form of colorless crystals which melt at 145° to 147° C.

Example 18

14.2 parts of hexahydrobenzhydrazide and 21 parts of benzimidoethyl ether hydrochloride are heated in 120 parts of N-methylpyrrolidone for an hour at 160° C. while stirring, the ammonium chloride formed is filtered off by suction and the 2-phenyl-5-cyclohexyl-1,3,4-oxdiazole formed is precipitated from the filtrate with water. 14 parts of the reaction product of the formula

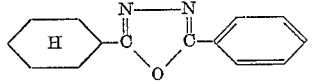

are obtained in the form of colorless crystals. The compound melts at 96° to 99° C.

*Example 19*

13.7 parts of isonicotinic acid hydrazide, 14 parts of acetimidoethyl ether hydrochloride and 120 parts of N-methylpyrrolidone are stirred for an hour at 160° C. The precipitated ammonium chloride is then filtered off by suction and the colorless filtrate concentrated in vacuo. After the reaction product has been recrystallized from ethanol, 17.6 parts of the oxdiazole of the structure

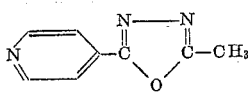

and having a melting point of 149° to 151° C. are obtained.

*Example 20*

13.6 parts of benzhydrazide and 23 parts of meta-tolimidoethyl ether hydrochloride are stirred in 130 parts of N-methylpyrrolidone for an hour at 160° C., and worked up according to Example 18. 21 parts of the reaction product are thus obtained in the form of colorless crystals which melt at 107° to 109° C. and have the following constitution

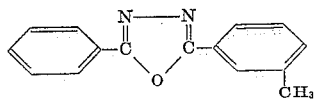

*Example 21*

13.7 parts of isonicotinic acid hydrazide, 23 parts of meta-tolimidoethyl ether hydrochloride and 130 parts of N-methylpyrrolidone are heated for an hour at 160° C. while stirring and worked up as described in Example 18. The following oxdiazole is obtained in a good yield (15.9 parts) in the form of colorless crystals of the melting point 127° to 129° C.

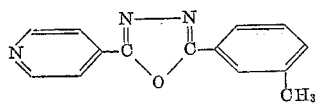

*Example 22*

A mixture of 14 parts of 1-aminoanthraquinone-2-carboxylic acid hydrazide, 12 parts of meta-tolimidoethyl ether hydrochloride and 140 parts of N-methylpyrrolidone is stirred for an hour at 160° C. After cooling, the reaction product is filtered off by suction, washed with methanol and dried. 15.8 parts of the following dyestuff are obtained in the form of red crystals of the melting point 277° to 280° C.

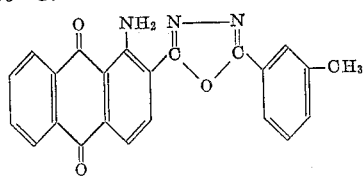

It dyes cotton powerful red shades from a red vat.

*Example 23*

15 parts of 1,4-diaminoanthraquinone-2-carboxylic acid hydrazide and 12 parts of meta-tolimidoethyl ether hydrochloride are stirred in 140 parts of N-methylpyrrolidone for an hour at 160° C. It is worked up as described in Example 22 and 16.2 parts of the dyestuff of the formula

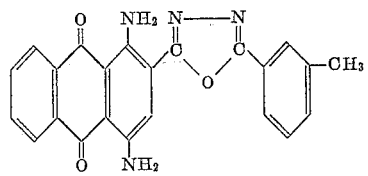

are obtained in the form of blue crystal needles which melt at 298° to 300° C. The dyestuff dyes cotton powerful bue shades from a dark red vat.

*Example 24*

13.7 parts of isonicotinic acid hydrazide and 25 parts of meta-nitrobenzimidomethyl ether hydrochloride are stirred in 130 parts of N-methylpyrrolidone for an hour at 160° to 170° C. After cooling the reaction mixture, the oxdiazole is precipitated by addition of water, 23.5 parts of the reaction product of the formula

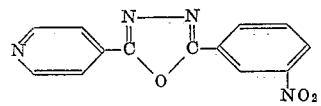

are thus obtained in the form of yellowish crystals which melt at 193° to 196° C.

*Example 25*

A mixture of 7 parts of benzhydrazide and 12 parts of hexahydrobenzimidoethyl ether hydrochloride is heated to boiling under reflux in 70 parts of pyridine for two hours. After the reaction mixture has been cooled, the 2-phenyl-5-cyclohexyl-1,3,4-oxdiazole is precipitated with water, 9.5 parts of the reaction product of the formula

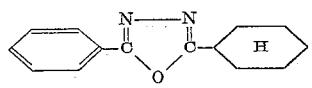

are obtained in the form of colorless crystals of the melting point 98° to 100° C. It agrees in its properties with the product described in Example 18.

*Example 26*

7 parts of isonicotinic acid hydrazide, 12 parts of hexahydrobenzimidoethyl ether hydrochloride and 70 parts of pyridine are boiled under reflux for two hours and worked up as described in Example 25. 7.7 parts of the reaction product of the formula

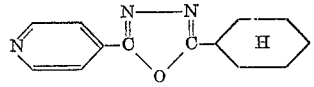

are obtained in the form of colorless crystals which melt at 124° to 126° C.

*Example 27*

A mixture of 7 parts of 1-aminoanthraquinone-2-carboxylic acid hydrazide and 6 parts of meta-nitrobenzimidomethyl ether hydrochloride is stirred in 100 parts of nitrobenzene for an hour at 160° to 170° C. It is then allowed to cool and the precipitate formed is separated. 7.2 parts of the dyestuff of the formula

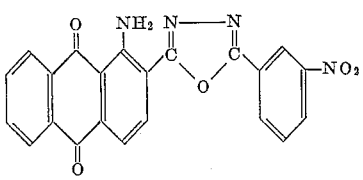

are obtained in the form of bronze colored crystal needles of the melting point 324° to 328° C. It dyes cotton powerful red shades from a red-brown vat.

Example 28

7 parts of 1,4-diaminoanthraquinone-2-carboxylic acid hydrazide, 6 parts of meta-nitrobenzimidomethyl ether hydrochloride and 100 parts of nitrobenzene are stirred for an hour at 160° to 170° C. and worked up as described in Example 27. 7.3 parts of the dyestuff of the formula

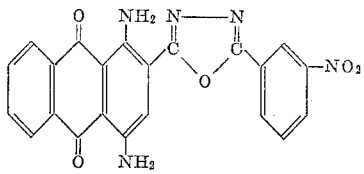

are obtained in the form of blue-violet crystals which melt at 284° to 286° C. The dyestuff dyes cotton powerful blue shades from a red-brown vat.

Example 29

10 parts of benzhydrazide and 10 parts of succinic acid bis-imidoethyl ether hydrochloride are heated in 120 parts of pyridine (or ethanol) under reflux at the boiling point for two hours. After cooling, the reaction product is filtered off by suction and recrystallized from ethanol. 4.5 parts of the bis-oxdiazole of the formula

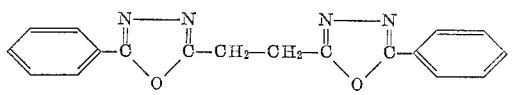

are obtained in the form of colorless crystals which melt at 200° to 202° C.

Example 30

A mixture of 41 parts of acetohydrazide, 75 parts of acetic acid imidoethyl ether hydrochloride and 400 parts of ethanol is heated to boiling under reflux for two hours and, after cooling, freed from ammonium chloride by filtration. Then the alcoholic solution is concentrated and the residual 2,5-dimethyloxdiazole-1,3,4 distilled in vacuo. It is obtained as a colorless oil of the boiling point 172° to 176° C. at 745 mm. Hg. The oxdiazole thus obtained and having the formula

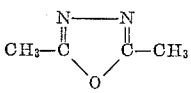

gives a colorless precipitate with aqueous mercuric chloride solution and has the melting point 161° to 163° C. in agreement with the literature. The yield is 39 parts.

We claim:

1. A process for the preparation of 1,3,4-oxdiazoles which comprises reacting a monoacyl hydrazide selected from the group consisting of acetohydrazide, benzhydrazide, 1-aminoanthraquinone-2-carboxylic acid hydrazide, 1,4-diaminoanthraquinone-2-carboxylic acid hydrazide, terephthalic acid dihydrazide, isonicotinic acid hydrazide, hexahydrobenzhydrazide, succinic acid hydrazide, succinic acid dihydrazide, isophthalic acid dihydrazide, with an imido-ether hydrochloride selected from the group consisting of benzimidoethyl ether hydrochloride, acetic acid imidoethyl ether hydrochloride, isophthalic acid bis-imidoethyl ether hydrochloride, succinic acid bis-imidoethyl ether hydrochloride, terephthalic acid bis-imidoethyl ether hydrochloride, formimidoethyl ether hydrochloride, m-tolimidoethyl ether hydrochloride, m-nitrobenzimidoethyl ether hydrochloride, and hexahydrobenzimidoethyl ether hydrochloride in the presence of an inert organic solvent and at a temperature of from about 70° C. to about 220° C.

2. A process as in claim 1 wherein said inert organic solvent is selected from the group consisting of ethanol, N-methyl pyrrolidone, pyridine, and nitrobenzene, and wherein the temperature is from about 70° C. to about 180° C.

References Cited in the file of this patent

UNITED STATES PATENTS

| | | |
|---|---|---|
| 2,376,380 | Porter et al. | May 22, 1945 |
| 2,733,245 | Ainsworth | Jan. 31, 1956 |
| 2,883,391 | Swain | Apr. 21, 1959 |

OTHER REFERENCES

Oberhummer: Chem. Abstracts, vol. 25, p. 1827 (1931).

Oberhummer: Chem. Abstracts, vol. 28, col. 2679 (1934).

Drozdov et al.: Chem. Abstracts, vol. 39, col. 3784 (1945).